United States Patent
Horikawa (10) Patent No.: US 9,686,530 B2
(45) Date of Patent: Jun. 20, 2017

(54) IMAGE PROCESSING APPARATUS AND IMAGE PROCESSING METHOD

(71) Applicant: CANON KABUSHIKI KAISHA, Tokyo (JP)

(72) Inventor: Yohei Horikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 14/920,086

(22) Filed: Oct. 22, 2015

(65) Prior Publication Data
US 2016/0119606 A1    Apr. 28, 2016

(30) Foreign Application Priority Data

Oct. 27, 2014    (JP) .................. 2014-218392

(51) Int. Cl.
| | |
|---|---|
| *H04N 5/228* | (2006.01) |
| *H04N 13/02* | (2006.01) |
| *H04N 13/00* | (2006.01) |
| *G06T 5/00* | (2006.01) |
| *G06T 5/50* | (2006.01) |

(52) U.S. Cl.
CPC ......... *H04N 13/0207* (2013.01); *G06T 5/003* (2013.01); *G06T 5/50* (2013.01); *H04N 13/0011* (2013.01); *H04N 13/0022* (2013.01); *G06T 2207/10052* (2013.01)

(58) Field of Classification Search
CPC ........... H04N 13/0207; H04N 13/0011; H04N 13/0022; G06T 5/003; G06T 5/50
USPC ...................................... 348/222.1, 345, 349
See application file for complete search history.

(56) References Cited

U.S. PATENT DOCUMENTS

| | | | | |
|---|---|---|---|---|
| 8,811,769 B1* | 8/2014 | Pitts | ............... | G06T 3/40 382/275 |
| 2012/0050562 A1* | 3/2012 | Perwass | ............... | H04N 5/2254 348/222.1 |
| 2013/0162861 A1* | 6/2013 | Yamamoto | ............. | H04N 13/02 348/222.1 |
| 2013/0250167 A1* | 9/2013 | Nagasaka | ............ | G02B 3/0037 348/360 |
| 2016/0309074 A1* | 10/2016 | Ishigami | ............. | G02B 3/0056 |

FOREIGN PATENT DOCUMENTS

JP         2013-247590 A    12/2013

* cited by examiner

*Primary Examiner* — Sinh Tran
*Assistant Examiner* — Zhenzhen Wu
(74) *Attorney, Agent, or Firm* — Cowan, Liebowitz & Latman, P.C.

(57) ABSTRACT

Provided is an image processing apparatus, including: a data acquisition unit configured to acquire light field data containing a plurality of parallax images; a setting unit configured to set a virtual focal plane of the light field data acquired by the data acquisition unit; a reconstruction unit configured to generate, based on the light field data acquired by the data acquisition unit, light field data in which a focal plane is moved to the virtual focal plane; a determination unit configured to determine a data reduction amount of the light field data generated by the reconstruction unit in accordance with a refocusable range of the light field data generated by the reconstruction unit; and a reduction unit configured to reduce an amount of data of the light field data generated by the reconstruction unit in accordance with the data reduction amount.

15 Claims, 7 Drawing Sheets

IMAGE PROCESSING APPARATUS AND IMAGE PROCESSING METHOD

BACKGROUND OF THE INVENTION

Field of the Invention

The present invention relates to an image processing apparatus and an image processing method.

Description of the Related Art

For example, an array of microlenses (MLs), which are arranged in the proportion of one to a plurality of pixels, is placed on a front surface of an image pickup element to acquire not only a two-dimensional intensity distribution of light but also information on a direction of incidence of a ray that enters the image pickup element, with the result that three-dimensional information on an object space may be obtained.

A camera (image pickup apparatus) capable of obtaining such three-dimensional information on the object space is called a "light field camera". Moreover, the three-dimensional information on the object space is called "light field data (LF data)". Acquisition of the LF data and image reconstruction processing after the photography enable image processing called "refocusing" such as changing a focus position of an image, changing a photographing view point, and adjusting a depth of field with a focus position at the time of acquiring the LF data being a center.

In the light field camera as described above, a plenoptic system has widely been known. In the plenoptic system, a plurality of photoelectric transducers (photodiodes) for photography are two-dimensionally arranged under the microlens array, and a focus lens included in an optical system serves as an exit pupil of each of the microlenses. In the image pickup apparatus having the above-mentioned configuration, it is known that a plurality of pieces of ray information from an object may be obtained by the photoelectric transducers located under the microlens. A two-dimensional image formed only of pixels at the same position in pixel groups located under the microlenses by using such ray information has a parallax with respect to a two-dimensional image formed only of pixels at a different position. The two-dimensional images having such parallaxes are combined to virtually move a focus plane of a recorded image.

The number of image pickup pixels of the above-mentioned plenoptic camera is expressed by the following expression (1):

$$LF\ \text{data} = N \times M \qquad (1),$$

where N represents the number of MLs of the image pickup element, and M represents the number of divisions of an image to be divided by one microlens.

Note that, the number of pieces of final output pixel data to be combined based on such LF data is the same as N, which is the number of microlenses.

As described above, the number of pieces of LF data is increased in accordance with the number of divided photoelectric transducers under the microlens, and in an image pickup apparatus having the refocusing function, when various kinds of signal processing are performed on the number of pieces of output pixel data, which is the final output, a processing load is increased. Further, when the image pickup pixel data is captured in various kinds of image signal processing units, a data storing unit having a large capacity is required. As a result, power consumption is increased with an increase in load of data processing, and further, the cost is increased due to an increase in capacity of the data storing unit with an increase in amount of data to be processed.

In order to address the above-mentioned problems, in Japanese Patent Application Laid-Open No. 2013-247590, there is disclosed a technology in which it is determined whether or not there is a possibility of performing refocusing depending on a distance at which an object is located, all pixels under the microlens are recorded in a case where there is a possibility of performing the refocusing, and the pixels are added and recorded in a case where there is no possibility of performing the refocusing.

SUMMARY OF THE INVENTION

According to one embodiment of the present invention, there is provided an image processing apparatus, including: a data acquisition unit configured to acquire light field data containing a plurality of parallax images; a setting unit configured to set a virtual focal plane of the light field data acquired by the data acquisition unit; a reconstruction unit configured to generate, based on the light field data acquired by the data acquisition unit, light field data in which a focal plane is moved to the virtual focal plane; a determination unit configured to determine a data reduction amount of the light field data generated by the reconstruction unit in accordance with a refocusable range of the light field data generated by the reconstruction unit; and a reduction unit configured to reduce an amount of data of the light field data generated by the reconstruction unit in accordance with the data reduction amount.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

In a case where recording of all pixels and addition and recording of the pixels are switched only in a particular region as in Japanese Patent Application Laid-Open No. 2013-247590, refocusing may be performed in a region in which all the pixels are recorded, but the refocusing cannot be performed in a region in which the pixels are added and recorded.

In such circumstances, in a case where the refocusing processing is performed on the region in which all pixels are recorded, the refocusing may be performed appropriately for the region in which all the pixels are recorded, but it is difficult to perform the refocusing appropriately for the region in which the pixels are added and recorded. In other words, based on an image obtained by the addition and recording of the pixels, it is difficult to generate a sharp image even if the image may be close to in focus, and it is also difficult to generate a natural bokeh shape even if the image may be far from in focus.

An exemplary embodiment of the present invention is hereinafter described in detail with reference to the attached drawings.

One Embodiment

An image processing apparatus and an image processing method according to a first embodiment of the present invention are described with reference to the drawings.

Figure 1:
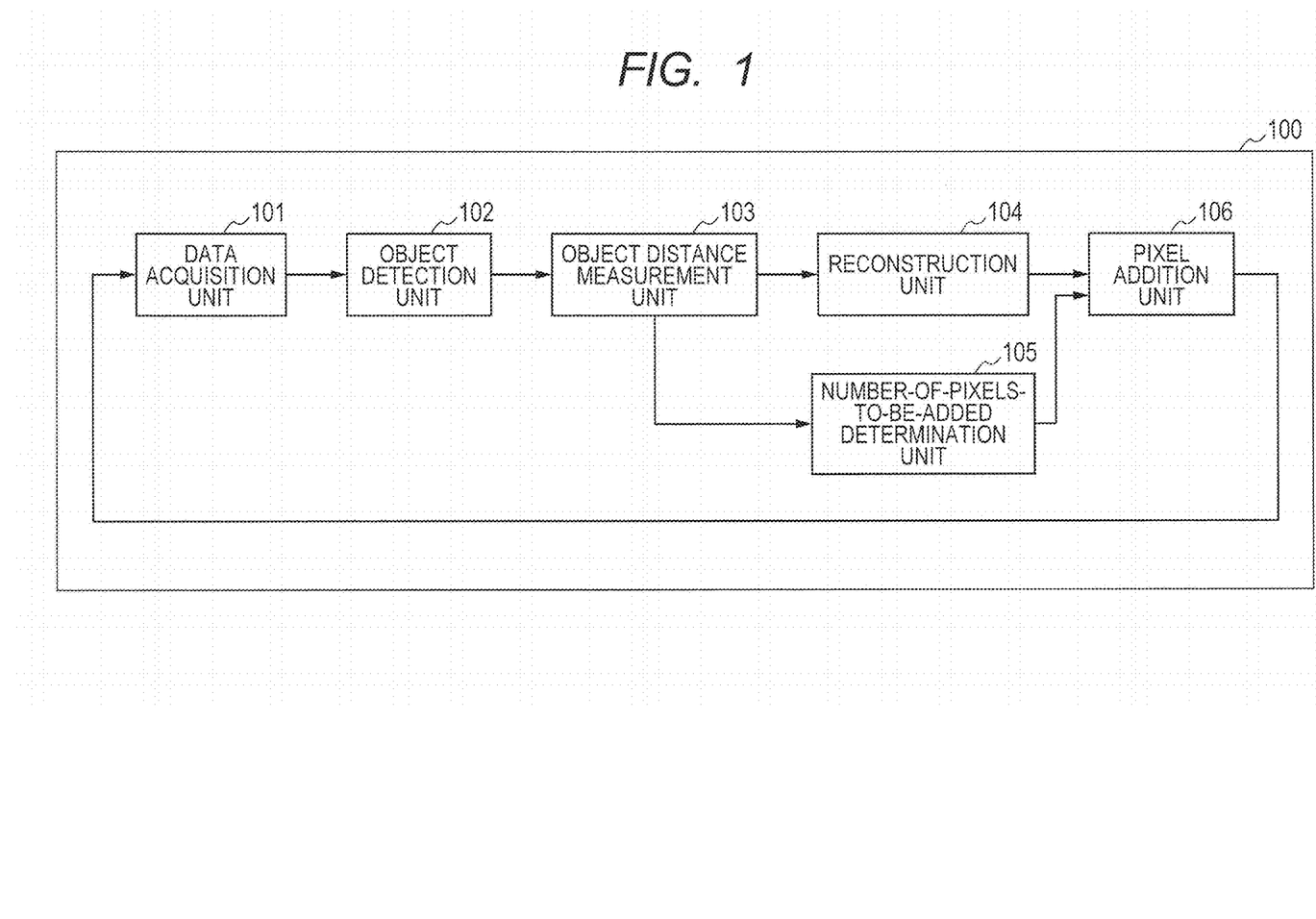
FIG. 1 is a block diagram of an image processing apparatus according to one embodiment of the present invention.

FIG. 1 is a block diagram for illustrating a configuration of an image processing apparatus 100 according to one embodiment of the present invention.

In FIG. 1, a data acquisition unit 101 reads light field data (LF data) recorded on a recording medium such as a memory card represented by an SD card from the recording medium, and outputs the LF data to an object detection unit 102. At this time, a system control unit (not shown) calculates a focal length, the number of divided pixels, a pixel pitch, and a conversion factor K value based on metadata recorded together with the LF data. Note that, the conversion factor K value is a factor for converting an image shift amount into a defocus amount. The conversion factor K value is given depending on divided pixels to be described below. In other words, in a case where there are 6×6=36 divided pixels, there are the same number of K values as the number of combinations for determining the image shift amount relative to a reference divided pixel, that is, 36−1=35 K values. Note that, the K value need not always be meta-information, and may be calculated approximately based on the pixel pitch and an f-value. The metadata is model information, and the information may be read from a table based on the model information, or the information may be described directly.

Figure 2:
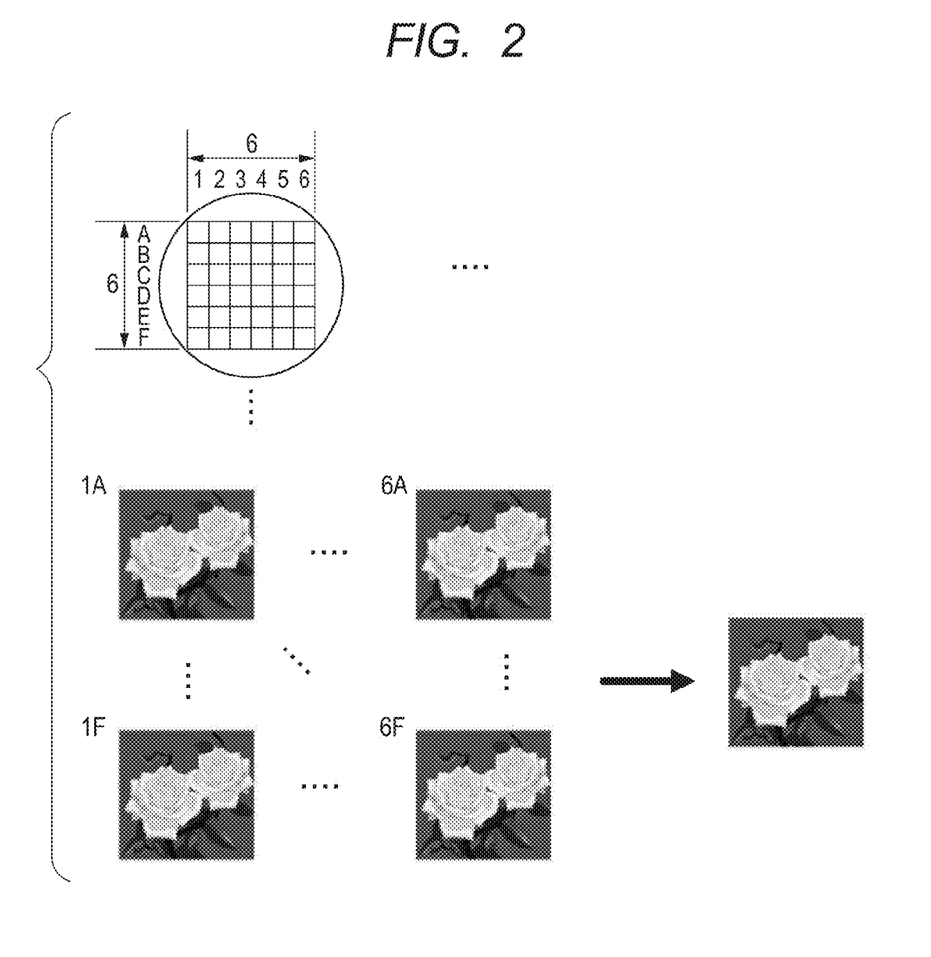
FIG. 2 is a view for illustrating an example of a pixel array for acquiring LF data and a restructured image generated by the LF data.

Now, the LF data used in the present invention is described with reference to FIG. 2. FIG. 2 is a view for illustrating an example of a pixel array arranged under a microlens to acquire the LF data, and an example of a restructured image generated based on the LF data.

The LF data used in the present invention is pixel data captured by a plenoptic camera.

A unit pixel cell of an image pickup element included in the plenoptic camera has the number of pixels (hereinafter referred to as "divided pixels") per microlens included in a microlens array, which in this embodiment is 6×6 divided pixels. Such unit pixel cells are two-dimensionally arranged in Bayer arrangement on the image pickup element, and the memory card records data acquired from the image pickup element as the LF data.

A two-dimensional image formed only of pixels located at the same position in the microlenses has a parallax with respect to a two-dimensional image formed only of pixels located at the same position that is different from the above-mentioned position. In other words, an image formed only of pixels at a coordinate 1A in FIG. 2 and an image formed only of pixels at a coordinate 2A have different parallaxes, and in a case of 6×6 divided pixels, 36 images having different parallaxes, which is the same number as the number of divisions, are obtained.

In general, in the plenoptic camera, the number of images having the different parallaxes, the number corresponding to the number of divided pixels, are combined to generate a refocused image. To briefly describe the refocused image illustrated in FIG. 2, in a case where the images are combined so as not to have parallaxes at the position of flowers, images that are in focus at the position of flowers and have parallaxes at the position of leaves are added and combined, with the result that a blurred image is obtained. On the other hand, in a case where the images are combined so as not to have parallaxes at the position of leaves, an image that is in focus at the position of leaves and is blurred at the position of flowers may be obtained. In addition, when a defocus amount by which a focal plane is to be moved is determined in advance, the divided pixels may be shifted and added based on a fixed value called "K value", which is defined between the divided pixels, to obtain an image after the focal plane is virtually moved.

Returning to FIG. 1, the object detection unit 102 is a unit configured to detect objects included in the input LF data, and in a case where a face is to be detected, for example, outputs coordinate information on the object having a possibility of performing the refocusing to an object distance measurement unit 103. For example, in a case where the LF data includes three people as objects, the object detection unit 102 outputs coordinate information on the three objects. As a detection method for the objects, a known technology such as pattern matching may be used for the detection. The detection method is not directly related to the present invention, and hence a description thereof is omitted here.

Note that, in the object detection unit 102, an image generated by adding all the divided pixels may be used to detect the objects, or an image obtained from a group of divided pixels at the same position under the microlenses, or from a group of divided pixels that are partially added may be used to detect the objects. In the case where the objects are detected based on the image generated by adding the pixels, a bright image having an excellent S/N ratio may be obtained, which enables recognition under low illuminance. Moreover, when the objects are detected based on the image obtained from the group of divided pixels, an image having a deep depth of field may be obtained, which enables recognition of objects located in a blurred region. Those two means may be switchably used based on the illuminance and the depth of field of the image generated by adding the pixels.

Alternatively, instead of coordinate positions of the people, coordinate information input by a user via a touch panel (not shown) or the like may be output to the object distance measurement unit 103 as long as coordinate positions of the image on which the refocusing is performed can be detected.

Moreover, even with a single object, in a case where the object is slanted in a depth direction, the defocus amount may be different depending on the part even in the same object. In such a case, a range of the object on which the refocusing is performed is divided into blocks, and coordinates in units of a block are notified to the object distance measurement unit 103. The processing may be performed as described above to set a refocusable range more appropriately.

The object distance measurement unit 103 calculates the defocus amount to the object based on the plurality of object coordinates output from the object detection unit 102, and outputs the calculated defocus amount to a reconstruction unit 104 and a number-of-pixels-to-be-added determination unit 105.

Figure 5A:
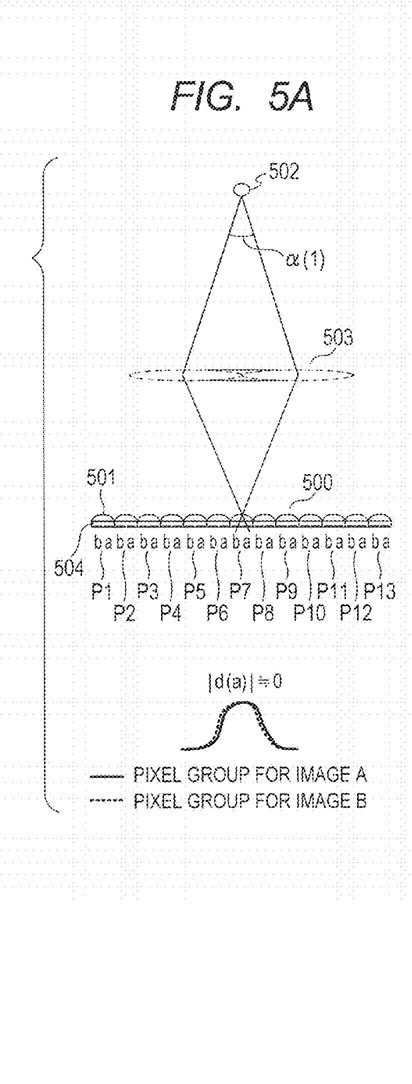
FIG. 5A, FIG. 5B, and FIG. 5C are diagrams for illustrating a distance measurement method using divided pixels.
Figure 5B:
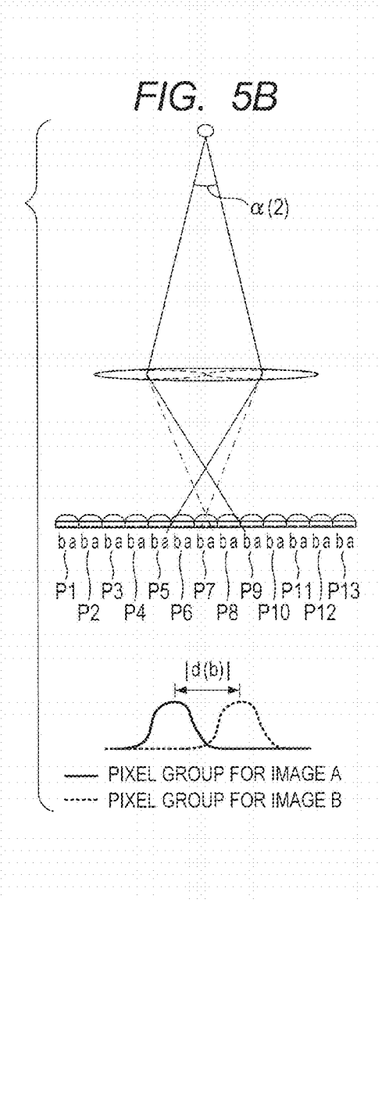
Figure 5C:
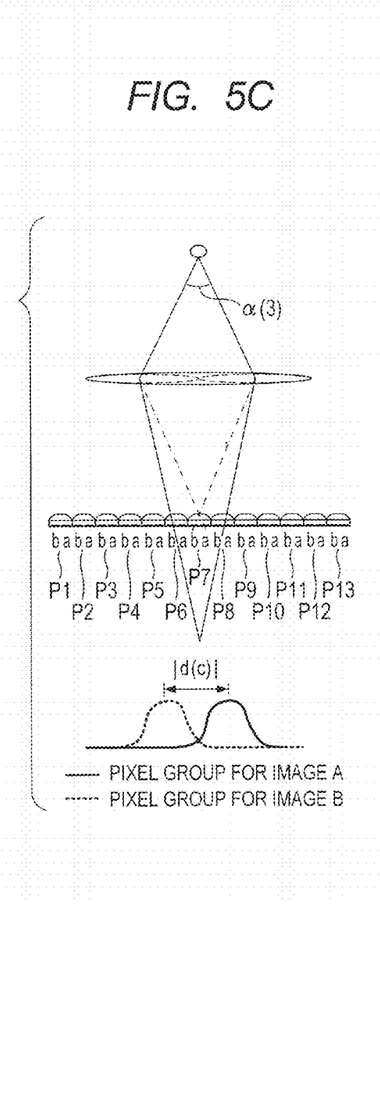

Now, a calculation method for the defocus amount is described with reference to FIG. 5A to FIG. 5C. FIG. 5A to FIG. 5C are diagrams for illustrating a distance measurement method using the divided pixels. An image pickup element 500 includes, under one microlens 501, a color filter 504 and a plurality of divided pixels (photoelectric transducers) a and b. The color filter 504 and the divided pixels a and b are schematically illustrated in FIG. 5A to FIG. 5C. The divided pixels a and b correspond to divided pixels at coordinates 1A and 6F in the unit pixel described with reference to FIG. 2, respectively. In this manner, in FIG. 5A to FIG. 5C, in order to avoid complexity, the divided pixel a corresponding to the coordinate 1A and the divided pixel b corresponding to the coordinate 6F are extracted for illustration.

FIG. 5A corresponds to an in-focus state, FIG. 5B corresponds to rear focus, and FIG. 5C corresponds to front focus.

At the time of distance measurement, pixel outputs from the divided pixels a and b are respectively combined in a column direction (or row direction) to generate data of an image A and an image B as outputs of unit pixel cell groups of the same color, and shifts between corresponding points of the images are determined by a sum of absolute differences (SAD) operation. A result of the SAD operation is determined by the following equation (2):

$$C = \Sigma |YAn - YBn| \quad (2).$$

In the above equation, n represents the number of microlenses in a horizontal direction. Moreover, values obtained by shifting corresponding pixels with respect to YBn are plotted, and a shift amount N at a time when the value is the smallest is an in-focus position.

As illustrated in FIG. 5A, when in focus, positions at which an image pickup optical system 503 forms images are photoelectric transducers under a microlens 501 at P7, and hence a pixel group for the image A and a pixel group for the image B approximately coincide. At this time, an image shift amount N(1), that is, d(a) between the pixel group for the image A and the pixel group for the image B, which is determined by a correlation operation, approximates 0.

As illustrated in FIG. 5B, at the time of the rear focus, as the positions at which the image pickup optical system 503 forms images, a pixel for the image A is a pixel (photoelectric transducer) under a microlens 501 at P5, and a pixel for the image B is a pixel under a microlens 501 at P9. At this time, an image shift amount N(2), that is, d(b) between the pixel group for the image A and the pixel group for the image B is determined by the correlation operation.

As illustrated in FIG. 5C, at the time of the front focus, as positions at which the image pickup optical system 503 forms images, a pixel for the image A is a pixel under the microlens 501 at P8, and the pixel for the image B is a pixel under the microlens 501 at P6. At this time, an image shift amount N(3), that is, d(c) between the pixel group for the image A and the pixel group for the image B, which is determined by the correlation operation, is an image shift amount in a direction opposite to that of the rear focus.

This means that when in focus, the pixel group for the image A and the pixel group for the image B see the same object 502, but at the times of the rear focus and the front focus, the pixel group for the image A and the pixel group for the image B see objects shifted by an image shift amount N. At this time, a defocus amount d may be determined by a known technology, and may be determined, based on the relationship between the image shift amount N and K uniquely determined by an aperture value of a lens, for example, by the following equation (3):

$$d = N \times K \quad (3).$$

Note that, K in the above equation is the K value acquired from the meta-information, refers to a conversion factor for converting a relative image shift amount between images respectively formed of the divided pixels at the coordinates 1A and 6F into the defocus amount, and is equivalent to K6F, which is to be described later.

The reconstruction unit 104 virtually moves the focal plane of the LF data to between the largest defocus amount and the smallest defocus amount of the outputs of the object distance measurement unit 103 to generate reconstructed LF data, and outputs the reconstructed LF data to a pixel addition unit 106.

Now, the virtual focal plane and defocus amounts of the detected objects, which have been described above, are specifically described with reference to FIG. 6.

Figure 6:
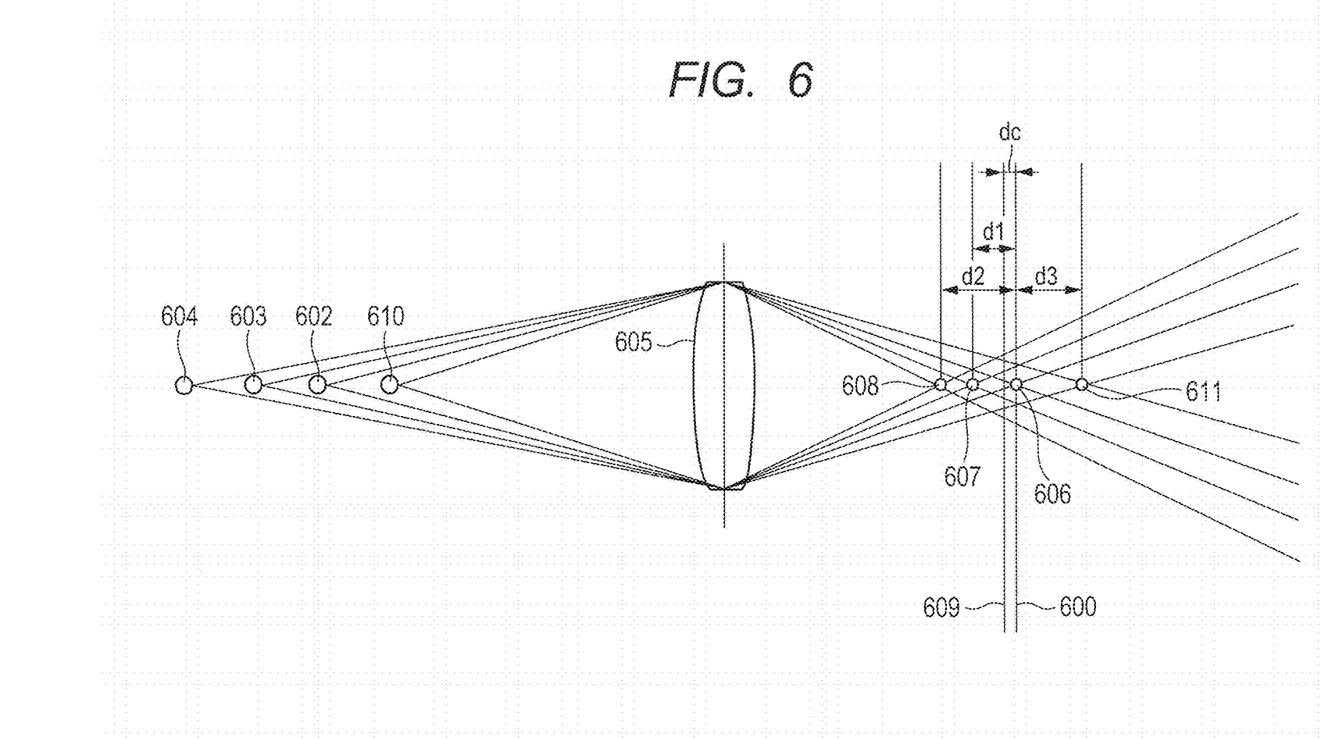
FIG. 6 is a view for illustrating a virtual focal plane set with respect to an in-focus plane based on defocus amounts of objects.

FIG. 6 is a view for illustrating objects located in a field and image plane positions at which the objects form images with respect to a focus lens. Note that, for simplicity of the description, a plurality of objects are described as being located at an image height center position of the focus lens, but in general, the objects are dispersed in the up-and-down direction of FIG. 6 at the time when an image is actually taken.

As illustrated in FIG. 6, objects 610, 602, 603, and 604 are located in the field, and the objects 610, 602, 603, and 604 form images on imaging planes 611, 606, 607, and 608 via an image pickup optical system 605. The imaging plane 606 of the object 602 coincides with (is in focus on) an image pickup surface 600. The imaging planes 607, 608, and 611 of the objects 603, 604, and 610 have defocus amounts d1, d2, and d3 with respect to the image pickup surface 600, respectively.

The reconstruction unit 104 detects, from among the defocus amounts d1 and d2 in a positive direction and the defocus amount d3 in a negative direction with respect to an in-focus plane 600, that is, the image pickup surface 600, the largest defocus amount d2 and the smallest defocus amount d3 to calculate a defocus amount dc with respect to an image plane 609 located at an intermediate position. Next, the reconstruction unit 104 shifts the divided pixels so that the focal plane of the LF data is moved to a position of the defocus amount dc.

Next, a calculation method for a shift amount is described.

As described above, there are the same number of K values as the number of combinations for determining the image shift amount relative to the reference divided pixel.

In this embodiment, assuming that the reference divided pixel is 1A, there are the same number of K values as the number of combinations of 1A and the divided pixels of coordinates indicated by columns 1 to 6 and rows A to F of 35 pixels excluding 1A, which are represented by K2A to K6F, respectively.

When shift amounts of the divided pixels at the coordinates 2A to 6F are represented by N2A to N6F, the shift amount N2A of the divided pixel at 2A as a representative example may be expressed as the following equation (4):

$$N2A = dc/K2A \quad (4).$$

The reconstruction unit 104 outputs LF data obtained by shifting (rearranging) the pixels based on the shift amounts N2A to N6F, which are determined based on the equation (4), to the pixel addition unit 106.

Shifting each of the divided pixels in accordance with the defocus amount dc as described above virtually moves the focal plane even in a case where, when the LF data is captured, an actual focal plane is not located at an optimal position between the objects on which the refocusing is to be performed, with the result that a similar effect as in a case where the actual focal plane is located at the optimal position between the objects on which the refocusing is to be performed may be obtained.

Note that, pixel addition in units of 6×6 pixels may be performed on the LF data obtained above to obtain a two-dimensional image on a virtual focal plane 609. In this embodiment, such processing is expressed as the movement of the virtual focal plane of the LF data.

The number-of-pixels-to-be-added determination unit 105 determines such a number of pixels to be added that contains the imaging planes 608 and 611 in the refocusable range with the virtual focal plane 609 being a center.

A change in refocusable range resulting from the pixel addition is described with reference to FIG. 3A to FIG. 3C and FIG. 4A to FIG. 4C.

Figure 3A:
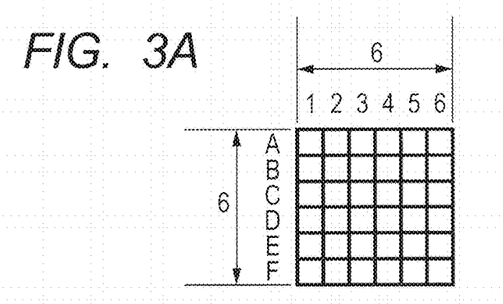
FIG. 3A, FIG. 3B, and FIG. 3C are views each for illustrating a unit of addition (unit of division) in pixel addition performed in the image processing apparatus according to the one embodiment of the present invention.
Figure 3B:
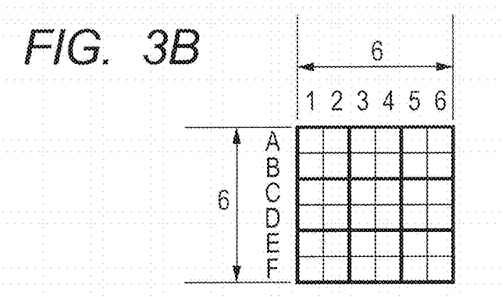
Figure 3C:
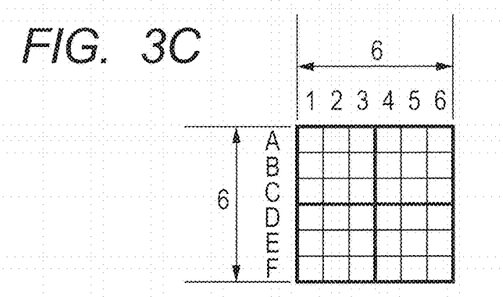

In each of FIG. 3A to FIG. 3C, a unit pixel cell of the image pickup element recorded in the LF data described with reference to FIG. 2 is illustrated, and the bold lines indicate units of addition at the time when the pixel addition is performed. The unit pixel cell is divided by the unit of addition to perform the addition of the divided pixels within the unit of addition (unit of division), with the result that the number of divisions (LF data amount) of the unit pixel cell is changed. In FIG. 3A, a case where the addition is not performed for the coordinates of each matrix, which are expressed by A, B, C, D, E, and F, and 1, 2, 3, 4, 5, and 6, is illustrated. In FIG. 3B, a case where the pixel addition is performed with 1A, 2A, 1B, and 2B being one unit, and is performed similarly for pixels at the other positions to divide the unit pixel cell by nine is illustrated. In FIG. 3C, a case where the pixel addition is performed with 1A, 2A, 3A, 1B, 2B, 3B, 1C, 2C, and 3C being one unit, and is performed similarly for pixels at the other positions to divide the unit pixel cell by four is illustrated. The pixels on which the pixel addition has been performed as described above form images at the same pixel position under the microlenses 501, with the result that 36, 9, and 4 parallax images may be obtained in FIG. 3A, FIG. 3B, and FIG. 3C, respectively.

It is desired that in the pixel addition as described above, when the numbers of divided pixels arranged under the microlens 501 are N for the number of horizontal pixels and M for the number of vertical pixels, the number of horizontal pixels N and the number of vertical pixels M be integral multiples of the number of pixels to be added. For example, in a case where the numbers of divisions are 16 for the number of horizontal pixels N and the number of vertical pixels M, it is desired that the numbers of pixels to be added in the horizontal and vertical directions be, in addition to four types: 1, 2, 4, and 8 pixels, 16 pixels with which the pixel addition is not performed. The above-mentioned configuration facilitates the processing when the refocusing processing is performed. Note that, the present invention is not limited to the case where the number of pixels to be added in the horizontal direction and the number of pixels to be added in the vertical direction are the same, and the number of horizontal pixels to be added and the number of vertical pixels to be added may be set separately, for example.

Figure 4A:
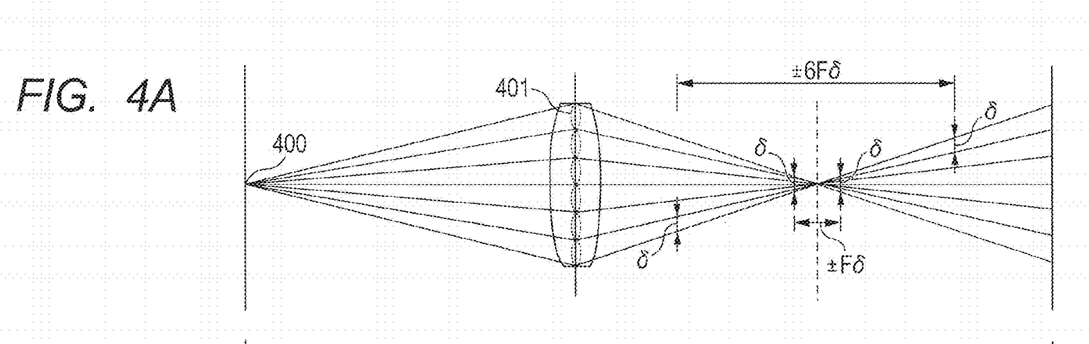
FIG. 4A, FIG. 4B, and FIG. 4C are views each for illustrating a refocusable range, which is determined in accordance with the pixel addition.
Figure 4B:
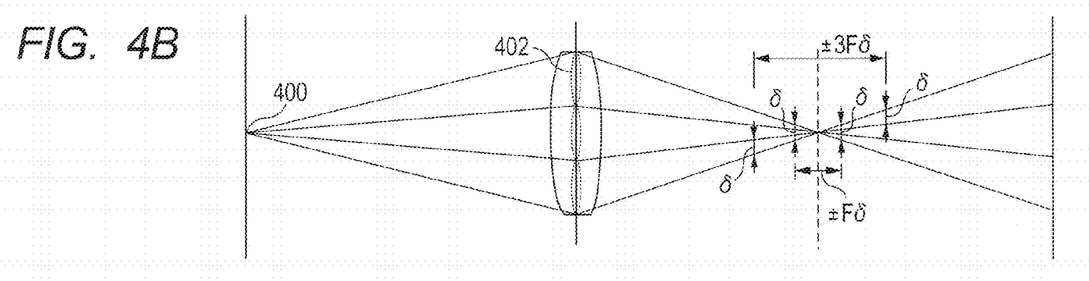
Figure 4C:
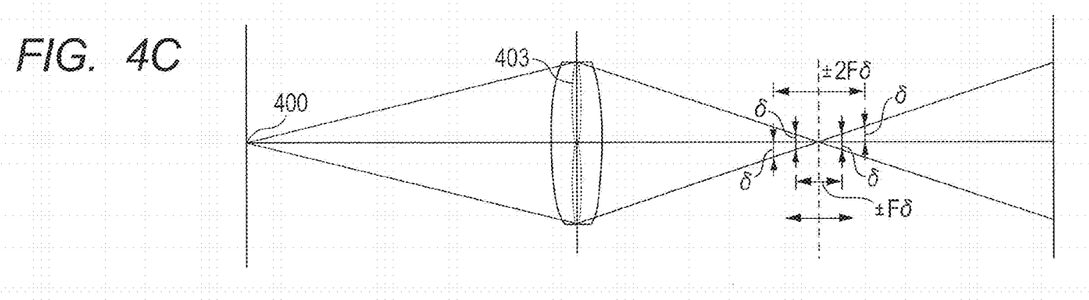

Depths of field of images formed of the pixels obtained by the pixel addition are described with reference to FIG. 4A to FIG. 4C. FIG. 4A to FIG. 4C are views each for illustrating a relationship between the number of pupil divisions of the image pickup optical system and the depth of field. FIG. 4A, FIG. 4B, and FIG. 4C correspond to FIG. 3A, FIG. 3B, and FIG. 3C, respectively. In FIG. 4A to FIG. 4C, the position of the object is denoted by the reference numeral 400.

In FIG. 4A, when an allowable blur circle is represented by $\delta$, and an aperture value of an imaging optical system is represented by F, the depth of field at the aperture value F is $\pm F\delta$. On the other hand, when an effective aperture value in the horizontal and vertical directions of a pupil partial area 401, which has been narrowed after the division into 6×6 as in FIG. 3A, is represented by $F_{01}$, $F_{01}=6F$ (6 is the number of divisions), which is dark. An effective depth of field of each of the parallax images becomes $\pm 6F\delta$, which is 6 times deeper, and an in-focus range becomes 6 times wider. In the range of the effective depth of field of $\pm 6F\delta$, object images that are in focus on the respective parallax images are acquired. The refocused image in a light field is an image obtained by combining the pixels, and hence an image formed of the pixels needs to be at least in focus. Therefore, the refocusing processing after the photography enables a defocus amount d to be virtually moved in a range of the following equation (5):

$$|d| \le 6F\delta \quad (5).$$

Note that, the allowable blur circle $\delta$ is defined as $\delta=2\Delta X$ (reciprocal of a Nyquist frequency $1/(2\Delta X)$ of a pixel period $\Delta X$), for example.

Similarly, in FIG. 4B, the 6×6 divided pixels are subjected to the pixel addition in units of 2×2 pixels to obtain a pupil partial area 402, and the defocus amount d may be virtually moved in a range of the following equation (6):

$$|d| \le 3F\delta \quad (6).$$

In FIG. 4C, the 6×6 divided pixels are subjected to the pixel addition in units of 3×3 pixels to obtain a pupil partial area 403, and the defocus amount d may be virtually moved in a range of the following equation (7):

$$|d| \le 2F\delta \quad (7).$$

As described above, the refocusable range of the refocusing using the parallax images is determined in accordance with the number of divided pixels sharing an exit pupil. This means that when the pixels are added and read from the image pickup element, the image obtained from the pixels that have been added and read is effective in reducing an amount of data, but has a shallow depth of field, with the result that the refocusable range becomes narrow.

The number-of-pixels-to-be-added determination unit 105 compares the defocus amount, which is obtained by d2−dc or d3+dc, and the refocusable range, which is determined by the number of pixels to be added, to determine such a number of pixels to be added that contains the objects in the refocusable range and has the largest value. The number of pixels to be added (data reduction amount) determined by the number-of-pixels-to-be-added determination unit 105 is output from the number-of-pixels-to-be-added determination unit 105 to the pixel addition unit 106.

As described with reference to FIG. 3A to FIG. 3C, the pixel addition unit 106 adds the divided pixels in accordance with the number of pixels to be added, which has been determined by the number-of-pixels-to-be-added determination unit 105, to reduce the amount of data of the LF data, and the pixel addition unit 106 outputs LF data generated by reducing the amount of data to the data acquisition unit 101. At this time, a refocused image obtained by the pixel addition in units of 6×6 pixels may be attached as a preview image of the LF data.

As described above, determining the number of pixels to be added based on the distance between the objects in the LF data recorded on the recording medium allows the amount of data of the LF data to be reduced efficiently while containing the range in which the objects in the depth direction are located in the refocusable range of the LF data after the amount of data is reduced. Moreover, moving the focal plane in the LF data recorded on the recording medium allows the data to be reduced appropriately even in a case where the focal plane at the time of the photography is not located between the objects on which the refocusing is to be performed.

Note that, in this embodiment, object detection has been performed by face detection. However, the object detection is not limited to that by means of the face detection, and any method may be employed as long as the objects on which the refocusing is performed may be detected. For example, when a portrait picture is to be taken, any method may be employed as long as refocusing may be performed in a range of a nose to an ear, positions of the nose and the ear may be selected to determine defocus amounts thereof, and the number of pixels to be added may be determined so that the nose and the ear are contained in the refocusable range. Moreover, when a still object is to be photographed, the still object to be photographed may be selected, an image may be divided into a plurality of regions, and the number of pixels to be added may be determined so that a region having the largest defocus amount of the divided regions is contained in the refocusable range.

Note that, in this embodiment, a center position between a far end and a near end in a distance distribution of the objects is set as the virtual focal plane of the LF data. However, the virtual focal plane is not limited to the center position between the far end and the near end in the distance distribution of the objects, and the virtual focal plane may be determined so that the far end and the near end in the distance distribution of the objects are contained in the refocusable range. For example, the defocus amount defined in the case where the divided pixels are added in the method of FIG. 3B to obtain 3×3 divided pixels is ±3Fδ. When the processing of shifting the divided pixels is performed to move the virtual focal plane of the LF data and then the divided pixels are added, the range of ±3Fδ may exceed the original range of ±6Fδ. In such a case, the virtual focal plane may be moved so that end portions of the refocusable range overlap end portions of the range of ±6Fδ to generate LF data having a wider refocusable range.

In the example described above, the positions of the objects are detected from the photographed image, and a defocus range of the objects is determined based on a result of the detection. However, instead of such a configuration, a configuration in which an object distance and the refocusable range are directly set may be employed.

For example, a configuration in which various setting units which may be used to directly set the refocusable range, for example, to set a refocusable range of an object at a distance of 4 m to 1 m, or to set a refocusable range of an object at a distance of 5 m to 50 cm, are included may be adopted. Determining the position of the virtual focal plane and the number of pixels to be added based on the object distance and the refocusable range that have been set allows the amount of data of the LF data to be reduced.

Note that, in this embodiment, each of the divided pixels is shifted by the reconstruction unit 104 to move the virtual focal plane in the LF data. However, the present invention is not limited thereto, and any configuration may be adopted as long as the addition and the combination may be performed. For example, instead of rearranging the divided pixels, for each of the divided pixels, the number of pixels by which the pixel is shifted may be held as metadata, and the metadata may be referred to when the pixel addition is performed to select a combination to be added.

Note that, in this embodiment, the LF data acquired by the plenoptic camera is taken as an example, and the pixels of the LF data having the parallaxes are expressed as the divided pixels. However, the present invention is not limited thereto, and any LF data may be adopted as long as the focal plane may be virtually moved from the parallax images. For example, the present invention may be applied to LF data obtained by a multiple-lens light field camera.

Note that, in this embodiment, the processing on the LF data that has already been recorded on the recording medium has been described, but in an image pickup apparatus without a drive mechanism for the focus lens, the present invention may be used as a unit in recording the LF data while reducing the amount of data. In that case, the photographed parallax images may be input as inputs to the object detection unit 102. In an image pickup apparatus including the drive mechanism, the divided pixels may be added after driving the actual focal plane without driving the virtual focal plane to perform an optimal reduction of the image data, but the present invention may also be used.

Figure 7:
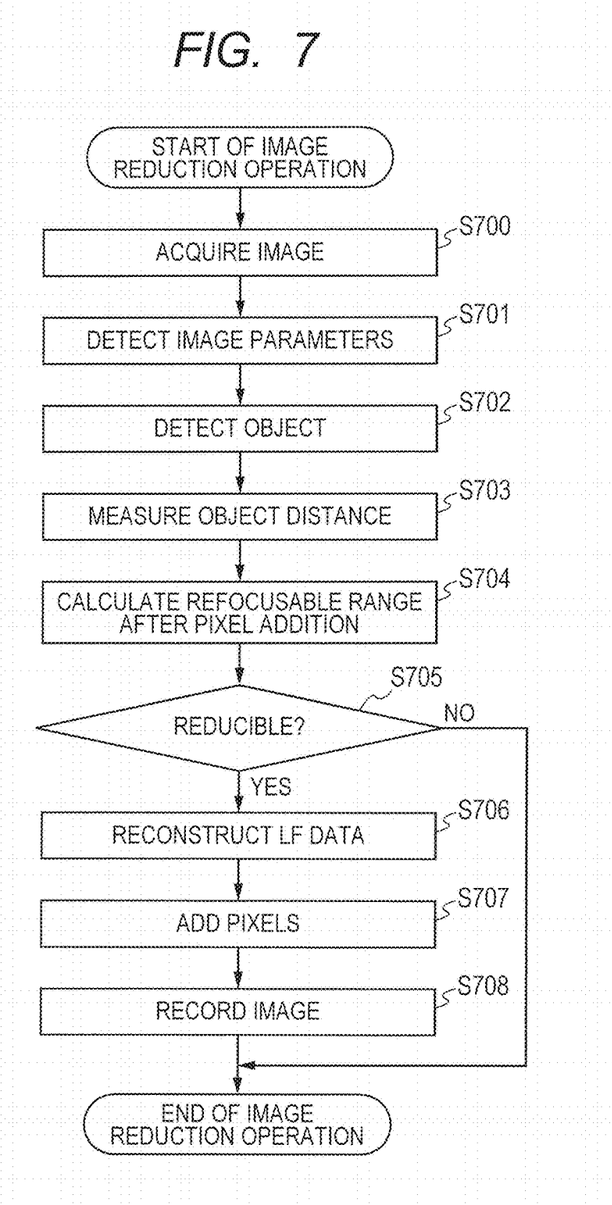
FIG. 7 is a flow chart for illustrating operation of image processing in the image processing apparatus according to the one embodiment of the present invention.

Next, operation of processing of reducing the amount of data of the LF data in the image processing apparatus according to this embodiment described above is described with reference to FIG. 7. FIG. 7 is a flow chart for illustrating the operation of the processing of reducing the amount of data of the LF data in the image processing apparatus according to this embodiment. The operation of the processing of reducing the amount of data, which is performed in accordance with the flow chart illustrated in FIG. 7, is realized by loading and executing a control program stored in a memory (not shown) by a CPU of a control unit (also not shown).

As illustrated in FIG. 7, in Step S700, the LF data recorded on the memory card or in a hard disk drive, or the LF data output from the image pickup element is acquired by the data acquisition unit 101, and the processing proceeds to Step S701.

In Step S701, the CPU reads the above-mentioned metadata from the LF data acquired by the data acquisition unit 101, the CPU detects optical data at the time of the photography, the recorded number of divided pixels, and the like, and the processing proceeds to Step S702.

In Step S702, the CPU specifies coordinates of a particular object on which the refocusing is to be performed, and the processing proceeds to Step S703. At this time, when the object is of a certain size or more, the CPU divides the same object into blocks, and the CPU calculates coordinates of the divided blocks. In Step S703, the object distance measurement unit 103 measures a distance of the object at the specified coordinate position, and calculates a defocus amount for each of the coordinates, and the processing proceeds to Step S704. Note that, as described above, in Steps S702 and S703, the user may directly set a range of object distances to be left, the object distance, and the refocusable range via an operation unit. For example, the user sets the refocusable range of the object at a distance of 5 m to 50 cm.

In Step S704, the CPU calculates a difference value (difference amount) between the defocus amount corresponding to the farthest end and the defocus amount corresponding to the nearest end of the defocus amounts output from the object distance measurement unit 103. In Step S705, it is determined whether or not the difference of the defocus amounts obtained by the calculation is contained in the refocusable range that is narrowed when the divided pixels are subjected to the pixel addition. As a result of the determination, in a case where the difference of the defocus amounts is contained in the refocusable range (YES in Step S705), it is determined that the amount of data is appropriately reducible by the pixel addition, and the processing proceeds to Step S706. In a case where the difference of the defocus amounts is not contained in the refocusable range (NO in Step S705), it is determined that the amount of data is not reducible, the user is notified of the determination, and the operation of the processing of reducing the amount of data is ended. Note that, in Steps S702 and S703, in the case where the object distance and the refocusable range are directly set, it is determined whether or not such LF data that the set refocusable range can be obtained is obtained by the pixel addition.

In Step S706, the reconstruction unit 104 performs processing of reconstructing the LF data based on the K value between the divided pixels described above, and the processing proceeds to Step S707. In Step S707, the number-of-pixels-to-be-added determination unit 105 compares the refocusable range at the time of adding each of the divided pixels described with reference to FIG. 3A to FIG. 3C and FIG. 4A to FIG. 4C, and the difference value of the defocus amounts calculated in Step S704, the number-of-pixels-to-be-added determination unit 105 selects such an addition method that minimizes the amount of data, and the processing of adding the divided pixels is performed by the pixel addition unit 106.

In Step S708, an image obtained by performing the addition processing is recorded in an external recording device, and the operation of the processing of reducing the amount of data is complete.

Executing the processing of each of the steps as described above allows the amount of data of the LF data to be reduced also by realizing the reduction of the amount of data of the LF data in the image processing apparatus according to this embodiment described above by a computer program.

As described above, according to this embodiment, the LF data capable of appropriately moving the virtual focal plane with respect to the entire image may be acquired while reducing the amount of data of the LF data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-218392, filed Oct. 27, 2014 which is hereby incorporated by reference wherein in its entirety.

What is claimed is:

1. An image processing apparatus, comprising:
   a data acquisition unit configured to acquire light field data containing a plurality of parallax images;
   a setting unit configured to set a virtual focal plane of the light field data acquired by the data acquisition unit;
   a reconstruction unit configured to generate, based on the light field data acquired by the data acquisition unit, light field data in which a focal plane is moved to the virtual focal plane;
   a determination unit configured to determine a data reduction amount of the light field data generated by the reconstruction unit in accordance with a refocusable range of the light field data generated by the reconstruction unit; and
   a reduction unit configured to reduce an amount of data of the light field data generated by the reconstruction unit in accordance with the data reduction amount.

2. The image processing apparatus according to claim 1, wherein the generation of the light field data to be performed by the reconstruction unit is rearrangement of the light field data acquired by the data acquisition unit in accordance with a shift amount that is based on a defocus amount of the virtual focal plane with respect to a focal plane of the light field data acquired by the data acquisition unit.

3. The image processing apparatus according to claim 1, wherein the data reduction amount is a number of pixels to be added of pixel data of a unit pixel cell including a plurality of divided pixels of the light field data, wherein the determination unit is configured to determine the data reduction amount in accordance with a relationship between the refocusable range in the light field data generated by the reconstruction unit and the number of pixels to be added, and wherein the reduction unit is configured to add the pixel data of the unit pixel cell of the light field data generated by the reconstruction unit in accordance with the number of pixels to be added.

4. The image processing apparatus according to claim 3, wherein, in a case where the unit pixel cell includes the divided pixels with a number of divisions being N×M, where N represents a number of horizontal pixels, and M represents a number of vertical pixels, the number of pixels to be added is a number of the divided pixels included in a unit of division for changing the number of divisions.

5. The image processing apparatus according to claim 4, wherein the data reduction amount to be determined by the determination unit is the number of pixels to be added which is largest and with which the refocusable range of the light field data generated by the reconstruction unit is capable of containing a far end and a near end at a position of an object.

6. The image processing apparatus according to claim 1, wherein the setting unit comprises an object detection unit configured to detect a position of an object from the light field data acquired by the data acquisition unit, and
wherein the setting unit sets the virtual focal plane in accordance with the position of the object.

7. The image processing apparatus according to claim 1, wherein the setting unit comprises a user setting unit to be used to set the virtual focal plane and a refocusable range of the light field data generated by the reconstruction unit.

8. The image processing apparatus according to claim 1, wherein the light field data comprises data of an image taken by using an image pickup element comprising a plurality of microlenses and a plurality of pixels respectively associated with the plurality of microlenses.

9. The image processing apparatus according to claim 1, wherein the light field data comprises data of an image taken by a plenoptic camera.

10. An image processing apparatus, comprising:
a data acquisition unit configured to acquire light field data containing a plurality of parallax images;
an instruction unit configured to issue an instruction to generate light field data having a reduced amount of data;
a reconstruction unit configured to generate, based on the light field data acquired by the data acquisition unit, in response to the instruction from the instruction unit, light field data in which a focal plane is moved to a virtual focal plane; and
a reduction unit configured to perform, on the light field data generated by the reconstruction unit, processing of adding pixel data of a unit pixel cell including a plurality of divided pixels to generate the light field data having the reduced amount of data,
wherein the reconstruction unit is configured to set the virtual focal plane so that a particular object detected using the light field data acquired by the data acquisition unit is contained in a refocusable range of the light field data having the reduced amount of data, and
wherein the reduction unit is configured to generate the light field data having the reduced amount of data by an addition method with which the particular object is contained in the refocusable range of the light field data having the reduced amount of data.

11. An image processing apparatus, comprising:
a data acquisition unit configured to acquire light field data containing a plurality of parallax images;
an instruction unit configured to issue an instruction to generate light field data having a reduced amount of data;
a reconstruction unit configured to generate, based on the light field data acquired by the data acquisition unit, in response to the instruction from the instruction unit, light field data in which a focal plane is moved to a virtual focal plane; and
a reduction unit configured to perform, on the light field data generated by the reconstruction unit, processing of adding pixel data of a unit pixel cell including a plurality of divided pixels to generate the light field data having the reduced amount of data,
wherein the reconstruction unit is configured to set a virtual focal plane so that a range of a specified object distance is contained in a refocusable range of the light field data having the reduced amount of data, and
wherein the reduction unit is configured to generate the light field data having the reduced amount of data by an addition method with which the range of the specified object distance is contained in the refocusable range of the light field data having the reduced amount of data.

12. An image processing method, comprising:
a data acquisition step of acquiring light field data containing a plurality of parallax images;
a setting step of setting a virtual focal plane of the light field data acquired in the data acquisition step;
a reconstruction unit step of generating, based on the light field data acquired in the data acquisition step, light field data in which a focal plane is moved to the virtual focal plane;
a determination step of determining a data reduction amount of the light field data generated in the reconstruction step in accordance with a refocusable range of the light field data generated in the reconstruction step; and
a reduction step of reducing an amount of data of the light field data generated in the reconstruction step in accordance with the data reduction amount.

13. An image processing method, comprising:
a data acquisition step of acquiring light field data containing a plurality of parallax images;
an instruction step of issuing an instruction to generate light field data having a reduced amount of data;
a reconstruction step of generating, based on the light field data acquired in the data acquisition step, in response to the instruction issued in the instruction step, light field data in which a focal plane is moved to a virtual focal plane; and
a reduction step of performing, on the light field data generated in the reconstruction step, processing of adding pixel data of a unit pixel cell including a plurality of divided pixels to generate the light field data having the reduced amount of data,
wherein the reconstruction step comprises setting the virtual focal plane so that a particular object detected using the light field data acquired in the data acquisition step is contained in a refocusable range of the light field data having the amount of data reduced in the reduction step, and
wherein the reduction step comprises generating the light field data having the reduced amount of data by an addition method with which the particular object is contained in the refocusable range of the light field data having the amount of data reduced in the reduction step.

14. An image processing method, comprising:
a data acquisition step of acquiring light field data containing a plurality of parallax images;
an instruction step of issuing an instruction to generate light field data having a reduced amount of data;
a reconstruction step of generating, based on the light field data acquired in the data acquisition step, in response to the instruction issued in the instruction step, light field data in which a focal plane is moved to a virtual focal plane; and
a reduction step of performing, on the light field data generated in the reconstruction step, processing of adding pixel data of a unit pixel cell including a plurality of divided pixels to generate the light field data having the reduced amount of data, wherein the reconstruction step comprises setting the virtual focal plane so that a range of a specified object distance is contained in a refocusable range of the light field data having the amount of data reduced in the reduction step, and wherein the reduction step comprises generating the light field data having the reduced amount of data by an addition method with which the range of the specified object distance is contained in the refocusable range of the light field data having the amount of data reduced in the reduction step.

15. A non-transitory computer-readable storage medium storing a program for causing a computer to function as:

a data acquisition unit configured to acquire light field data containing a plurality of parallax images;

a setting unit configured to set a virtual focal plane of the light field data acquired by the data acquisition unit;

a reconstruction unit configured to generate, based on the light field data acquired by the data acquisition unit, light field data in which a focal plane is moved to the virtual focal plane;

a determination unit configured to determine a data reduction amount of the light field data generated by the reconstruction unit in accordance with a refocusable range of the light field data generated by the reconstruction unit; and a reduction unit configured to reduce an amount of data of the light field data generated by the reconstruction unit in accordance with the data reduction amount.

* * * * *